(12) United States Patent
Bin Ahmad (10) Patent No.: US 7,252,256 B2
(45) Date of Patent: Aug. 7, 2007

(54) DUAL BEARING REEL

(75) Inventor: Abu Supian Bin Ahmad, Pontian (MY)

(73) Assignee: Shimano Components (Malaysia) SDN. BHD., Pontian (MY)

( * ) Notice: Subject to any disclaimer, the term of this patent is extended or adjusted under 35 U.S.C. 154(b) by 0 days.

(21) Appl. No.: 11/521,414

(22) Filed: Sep. 15, 2006

(65) Prior Publication Data

US 2007/0114314 A1 May 24, 2007

(30) Foreign Application Priority Data

Oct. 13, 2005 (JP) .............................. 2005-298727

(51) Int. Cl.
*A01K 89/015* (2006.01)
(52) U.S. Cl. ..................................................... 242/245
(58) Field of Classification Search ................ 242/244, 242/245, 286, 302, 303, 304
See application file for complete search history.

(56) References Cited

U.S. PATENT DOCUMENTS 3,074,664 A * 1/1963 Beger .......................... 242/233
4,930,722 A * 6/1990 Toda ........................... 242/245
5,120,001 A * 6/1992 Kaneko ....................... 242/245

FOREIGN PATENT DOCUMENTS

| EP | 406898 A1 * | 1/1991 |
| GB | 2245470 A * | 1/1992 |
| JP | 2001-238581 A | 9/2001 |

* cited by examiner

*Primary Examiner*—Emmanuel M Marcelo
(74) *Attorney, Agent, or Firm*—Global IP Counselors, LLP (57) ABSTRACT

A dual bearing reel has a plurality of friction plates that are arranged so as to contact an end portion of a spool shaft, a cap member that is detachably mounted on a boss portion and a spring member. A friction force is adjusted by press fitting the friction plates onto the end portion of the spool shaft 16 with the spring member. The spring member is fixed and mounted on the boss portion to provide an urging force between the cap member and a bearing. The spring member retains the bearing with respect to the boss portion and restricts rotation of the cap member. The spring member has a small diameter portion that contacts the cap member and a large diameter portion fixed to the boss portion to contact an end portion of the bearing.

2 Claims, 9 Drawing Sheets

DUAL BEARING REEL

CROSS-REFERENCE TO RELATED APPLICATIONS

This application claims priority under 35 U.S.C. § 119 to Japanese Patent Application No. 2005-298727. The entire disclosure of Japanese Patent Application No. 2005-298727 is hereby incorporated herein by reference.

BACKGROUND OF THE INVENTION

1. Field of the Invention

The present invention generally relates to a dual bearing reel. More specifically, the present invention relates to a dual bearing reel that enables fishing line to be reeled out and retrieved.

2. Background Information

Generally, a dual bearing reel is comprised of a reel unit and a spool that is rotatably mounted on the reel unit. A dual bearing reel in this type of a spinning reel is provided with a casting control mechanism in order to adjust resistance force when the spool is rotating. The casting control mechanism includes a plurality of friction plates and a cap member. The friction plates are arranged so as to contact both end portions of the spool shaft. At least one of the friction plates is arranged on a bottom portion in the inner peripheral side of the cap member. The cap member is threaded to a peripheral surface of a boss portion protruding one side of the reel unit The cap member adjusts friction force by press fitting the friction plates onto end portions of the spool shaft. In addition, both end portions of the spool shaft are rotatably supported by bearings. One of the bearings is disposed at the inner peripheral side of the boss portion. A spring member that restricts rotation of the cap member is press fitted between an outer end portion in the axial direction of the bearing and the friction plates mounted on the bottom portion in the inner peripheral side of the cap member. (See, for example, Japanese Unexamined Patent Publication No. 2001-238581.)

In the conventional configuration, rotation of the cap member is restricted because the spring member is press fitted between the outer end portion in the axial direction of the bearing and the friction plates mounted on the bottom portion in the inner peripheral side of the cap member to restrict rotation of the cap member. However, because the spring member is not fixed to the boss portion or the cap member and the outer end portion in the axial direction of the bearing is only fitted by the spring member, the spring member or the bearing may be inclined to fall off outwardly. Thus, arranging an E-shaped retaining ring and the like on the outer end portion in the axial direction of the bearings has been considered, however, the overall number of parts will be increased and the manufacturing cost will also be increased.

In view of the above, it will be apparent to those skilled in the art from this disclosure that there exists a need for an improved dual bearing reel in which the spring member and the bearing can be retained with respect to the boss portion with an inexpensive structure. This invention addresses this need in the art as well as other needs, which will become apparent to those skilled in the art from this disclosure.

SUMMARY OF THE INVENTION

A dual bearing reel according to a first aspect of the present invention is a dual bearing reel that includes a reel unit, a boss portion, a spool, a spool shaft, a cap member, a bearing and a spring member. The reel unit is configured to be mounted on a fishing rod. The boss portion is disposed on a side of the reel unit. The boss portion includes a male threaded portion formed on an outer periphery thereof and a through hole formed on an inner periphery thereof. The spool is rotatably mounted on the reel unit and configured to wind fishing line. The spool shaft is non-rotatably mounted in the spool and includes a first end portion rotatably supported at another side of the reel unit and a second end portion rotatably supported at the boss portion. The cap member is detachably mounted on the boss portion and includes a female threaded portion selectively engaged with the male threaded portion and an accommodation portion at an inner peripheral side of the cap member. The bearing is disposed on an inner peripheral surface of the through hole and supports the second end portion of the spool shaft. The spring member is fixed and mounted on the boss portion to provide an urging force between the accommodation portion and the bearing. The spring member retains the bearing with respect to the boss portion and restricts rotation of the cap member.

In this dual bearing reel, the spring member is fixed and mounted on the boss portion with an urging force between the accommodation portion in the inner periphery side of the cap member and the bearing. The spring member retains the bearing with respect to the boss portion and restricts rotation of the cap member. Because the single spring member retains the bearing with respect to the boss portion, restricts rotation of the cap member, and further prevents the spring member itself from falling off all at the same time, the spring member and the bearing are retained with respect to the boss portion with an inexpensive structure.

The dual bearing reel according to a second aspect of the present invention is a dual bearing reel as set forth in the first aspect of the present invention, wherein an annular mounting groove is formed on the through hole in order that the at least one part of the outer periphery which is axially outward of the bearing is overlapped, and the spring member includes a large diameter portion engaged in the mounting groove. In this case, the bearing and the spring member can be retained at the same time by engaging the large diameter portion provided on the spring member to the mounting groove.

According to the present invention, in the dual bearing reel, the spring member and the bearing are retained with respect to the boss portion with an inexpensive structure by providing the spring member that is fixed and mounted on the boss portion with urging force between on the bottom portion in the inner periphery side of the cap member and the bearing, and retains the bearing with respect to the boss portion and restricts rotation of the cap member.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
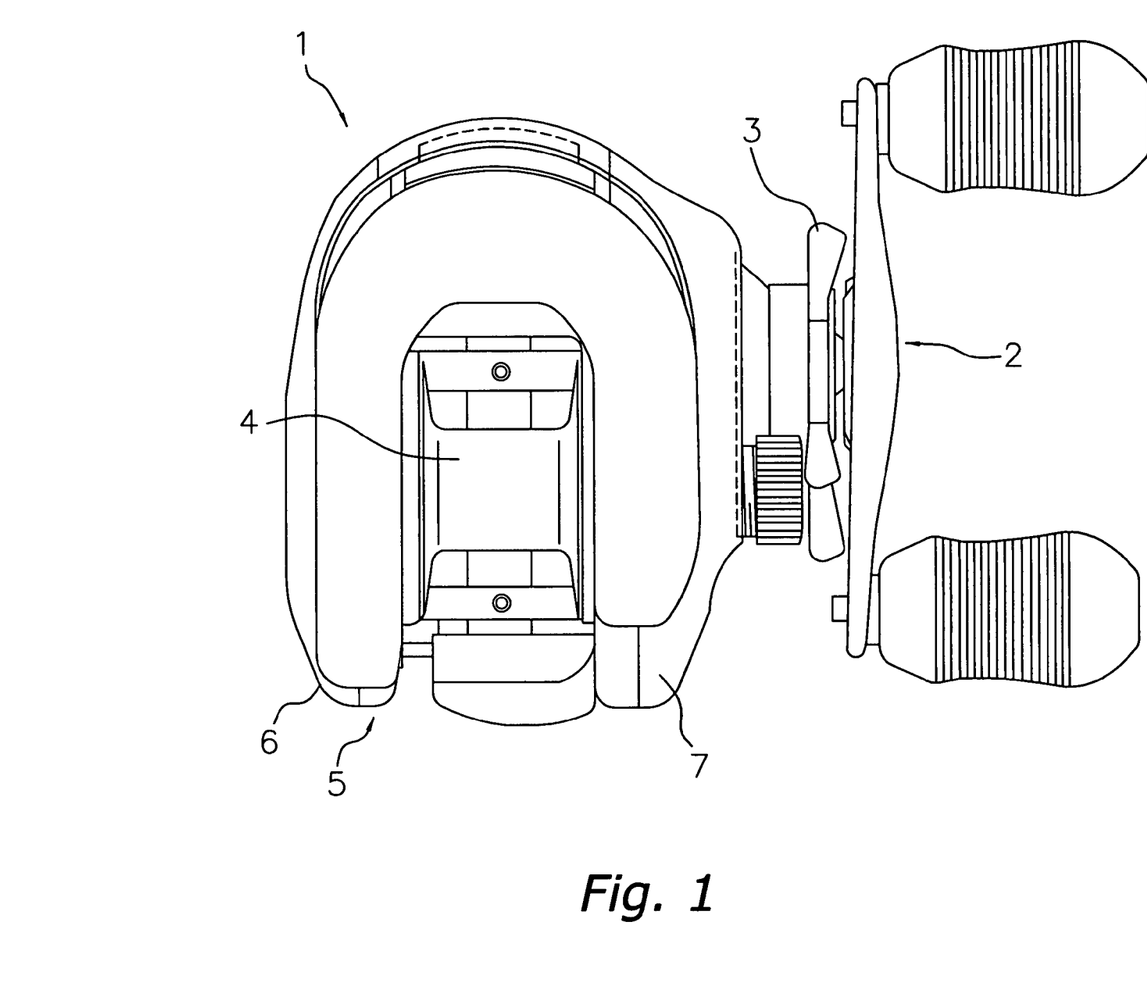
FIG. 1 is a plan view of a dual bearing reel in accordance with a first embodiment of the present invention.

Referring initially to FIG. 1, a dual bearing reel is illustrated in accordance with a first embodiment of the present invention. The dual bearing reel includes a reel unit 1, a handle 2, a star drag 3 and a spool 4. The star drag 3 is for adjusting the drag that is disposed on the side of the reel unit 1 of the handle 2. The handle 2 is for rotating the spool 4 that is disposed on one side of the reel unit 1.

Figure 2:
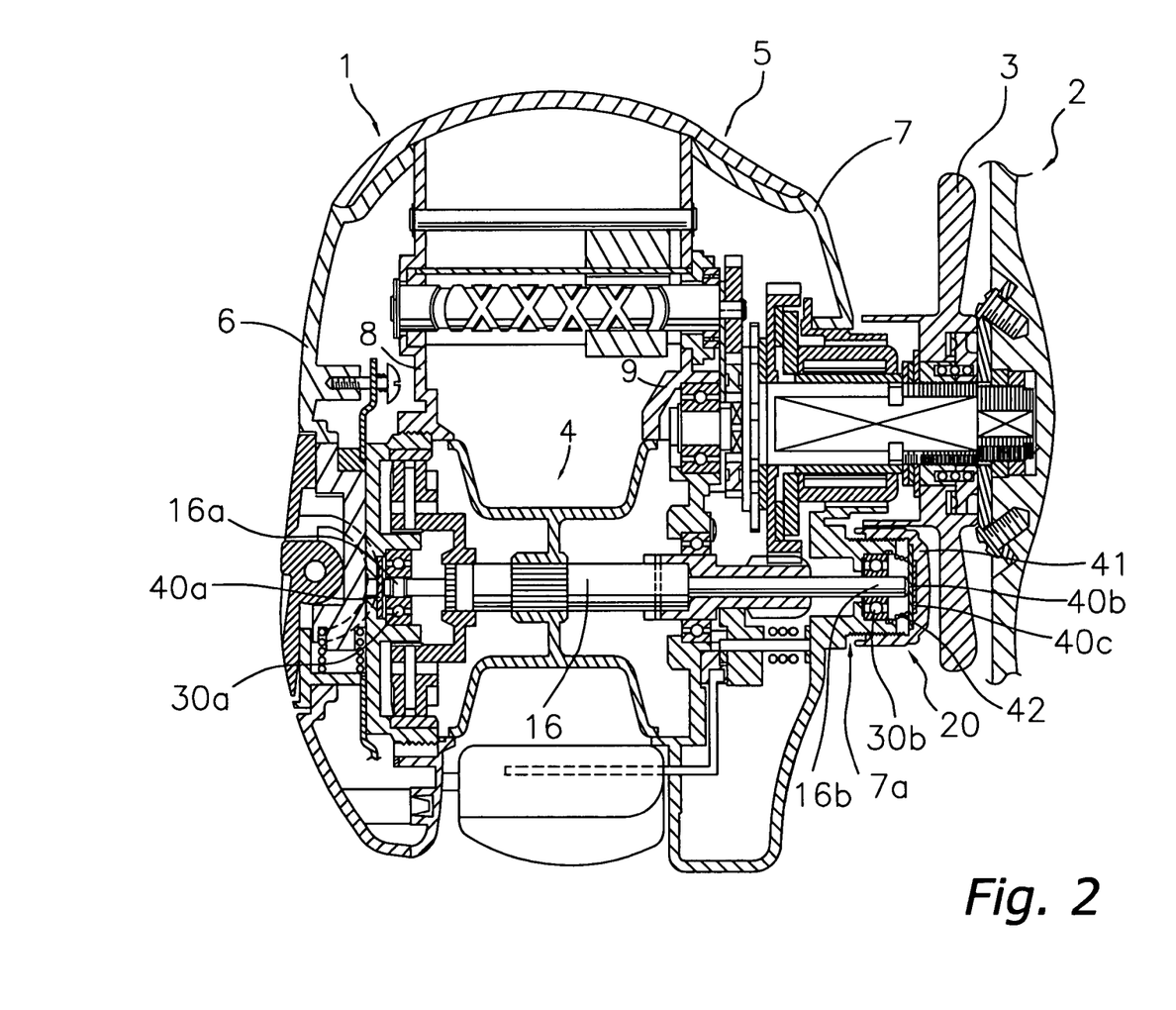
FIG. 2 is a cross-sectional view of the dual bearing reel of FIG. 1 in accordance with the first embodiment of the present invention.

As shown in FIG. 2, the reel unit 1 has a frame 5, a first side cover 6 and a second side cover 7. The first and second side covers 6 and 7 are each mounted on an opposing side of the frame 5. The frame 5 includes a first side plate 8 and a second side plate 9 that are disposed so as to face each other across a predetermined gap.

Referring to FIG. 2, the spool 4 is disposed in the frame 5. The spool 4 has an outer periphery on which fishing line is wound. The spool 4 is non-rotatably mounted to a spool shaft 16. The spool shaft 16 passes through and is fixed to an inner periphery of the spool 4. The spool shaft 16, as shown in FIG. 2, has a first end portion 16a and a second end portion 16b. The first end portion 16a is rotatably supported by a first bearing 30a, which is arranged on the first side plate 8. The second end portion 16b passes through the second side plate 9. The second end portion 16b is rotatably supported by a second bearing 30b, which is arranged in the second side cover 7.

Figure 3:
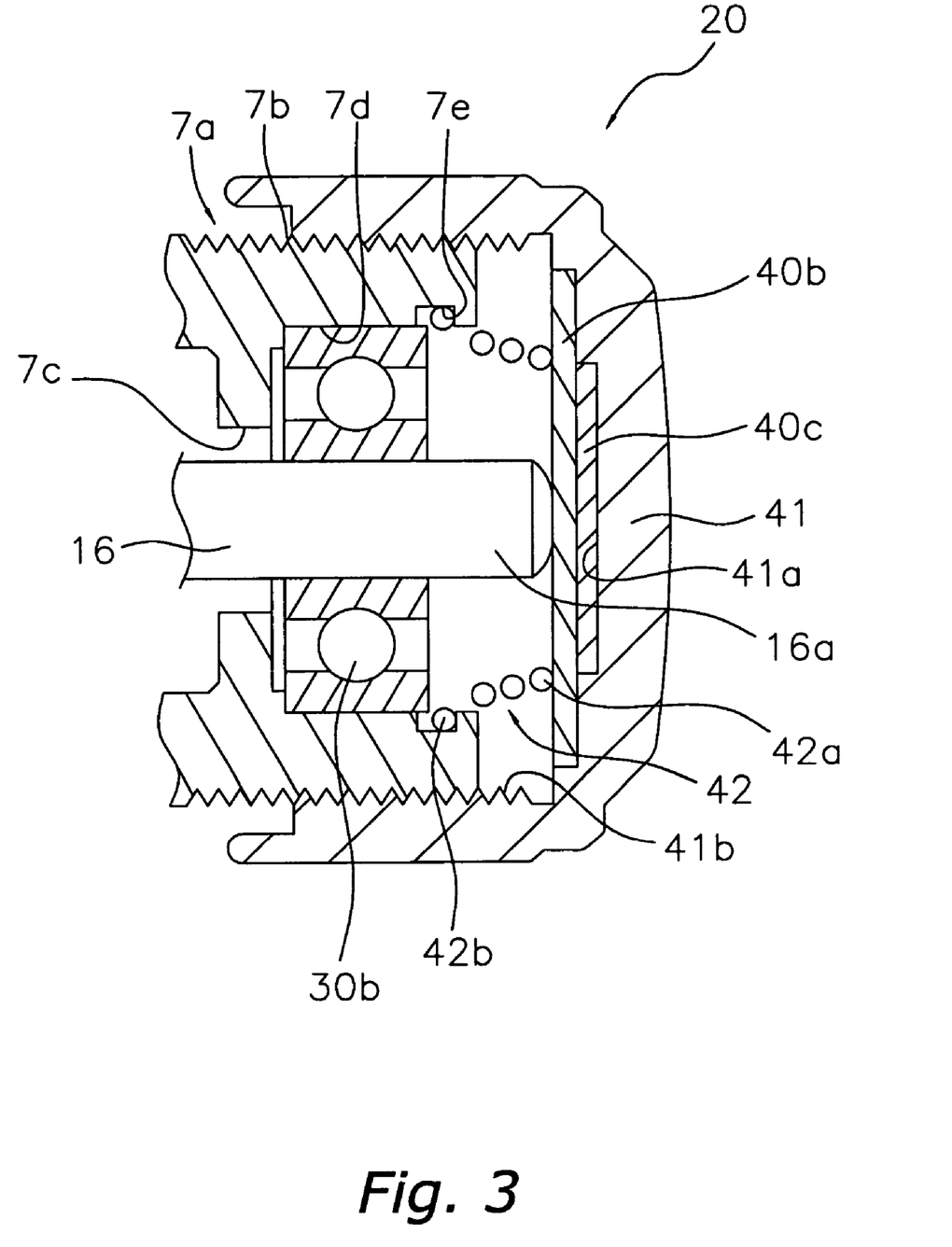
FIG. 3 is an enlarged partial cross-sectional view of a casting control mechanism of the dual bearing reel of FIGS. 1 and 2 in accordance with the first embodiment of the present invention.

Referring to FIGS. 2 and 3, the second side cover 7 has a cylindrical shaped boss portion 7a that protrudes outward and is unitarily formed at an outer side of the second side cover 7. The boss portion 7a includes a male threaded portion 7b, a through hole 7c, a mounting recess portion 7d and an annular mounting groove portion 7e. The male threaded portion 7b is formed on an outer periphery of the boss portion 7a. The through hole 7c is formed on an inner periphery of the boss portion 7a. The mounting recess portion 7d is formed on an inner periphery of the through hole 7c. The second bearing 30b is mounted in the mounting recess portion 7d. The mounting groove portion 7e is outwardly formed on the inner periphery of the through hole 7c in the axial direction so as to have a deeper channel than the mounting recess portion 7d. The mounting groove portion 7e is formed such that at least a portion of the mounting groove potion 7e overlaps an axial end of the second bearing 30b in an outwardly axial direction.

A casting control mechanism 20 adjusts a resistance force that is applied when the spool 4 is rotating. The casting control mechanism 20 includes a first friction plate 40a, a second friction plate 40b and a third friction plate 40c that are arranged so as to contact the first and second end portions 16a and 16b of the spool shaft 16. The casting control mechanism 20 further includes a cap member 41 and a spring member 42. The cap member 41 is detachably mounted on the boss portion 7a. The cap member 41 adjusts the resistance force by pressing the first, second and third friction plates 40a, 40b and 40c onto the first and second end portions 16a and 16b of the spool shaft 16. The spring member 42 is fixed and mounted on the boss portion 7a to provide an urging force between the cap member 41 and the second bearing 30b. The spring member 42 retains the second bearing 30b with respect to the boss portion 7a and restricts rotation of the cap member 41.

The first, second and third friction plates 40a, 40b and 40c are plate-shaped members made of metal. As shown in FIG. 2, the first friction plate 40a is arranged so as to contact the first end portion 16a of the spool shaft 16. The second friction plate 40b is arranged so as to contact the second end portion 16b of the spool shaft 16. The second and third friction plates 40b and 40c are fixed on a portion of the cap member 41.

Figure 4:
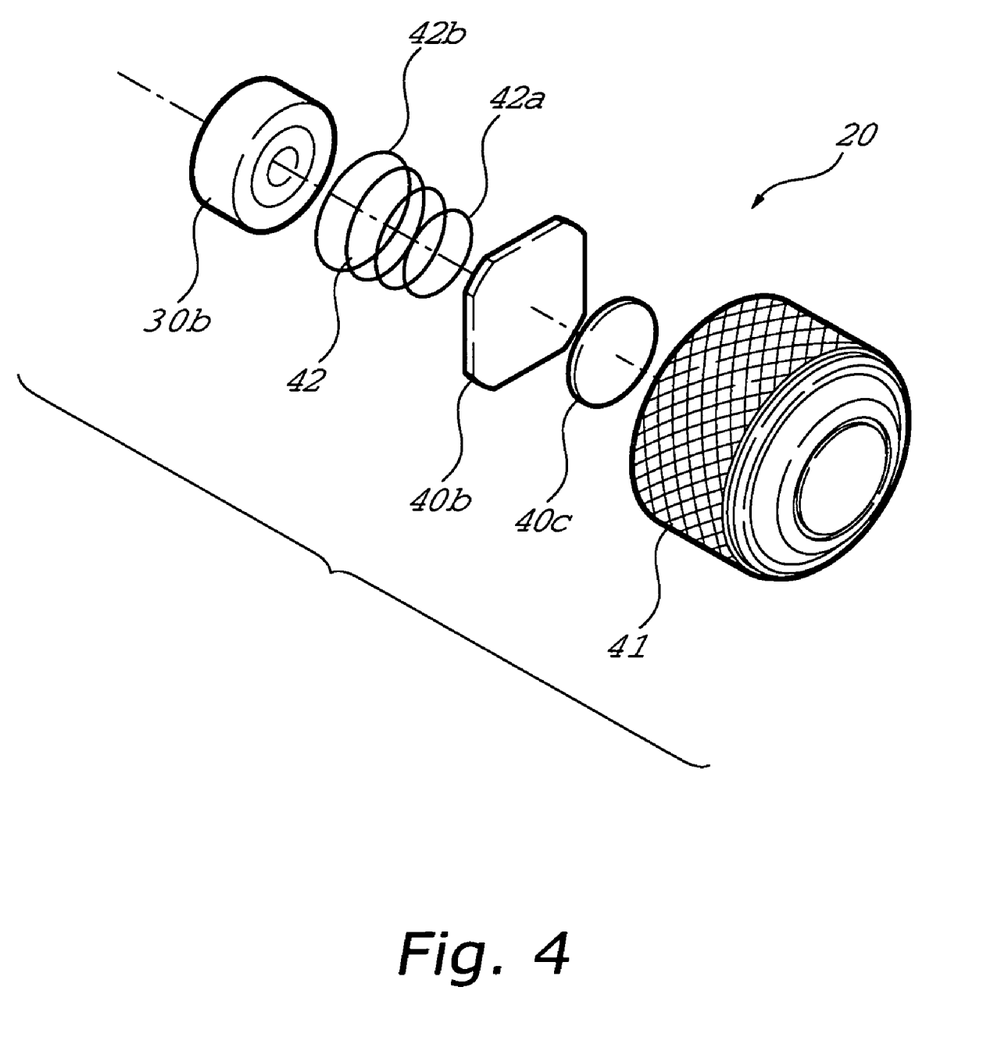
FIG. 4 is an enlarged perspective view of the casting control mechanism of the dual bearing reel in accordance with the first embodiment of the present invention.

The cap member 41 is a closed end tubular member. Referring to FIGS. 2 through 4, the cap member 41 has an accommodation portion 41a with a stepped recess portion, and a female threaded portion 41b. The accommodation portion 41a is formed at an inner peripheral side of the cap member 41. The female threaded portion 41b is formed on an inner periphery of a cylindrical portion of the cap member 41. The female threaded portion 41b engages with the male threaded portion 7b. The cap member 41 is attached/removed while adjusting the resistance force on the first and second end portions 16a and 16b of the spool shaft 16 by selectively engaging the female threaded portion 41b with the male threaded portion 7b.

Still referring to FIGS. 3 and 4, the spring member 42 has a small diameter portion 42a and a large diameter portion 42b. The small diameter portion 42a is adjacent the accommodation portion 41a of the cap member 41. The large diameter portion 42b is formed to have a larger diameter than a diameter of the small diameter portion 42a. The spring member 42 includes a coil spring having a diameter that gradually expands from the small diameter portion 42a toward the large diameter portion 42b. The restriction force is generated by compression of the spring member 42 when the cap member 41 is mounted. The small diameter portion 42a is arranged so as to contact the second friction plate 40b mounted on the accommodation portion 41a of the cap member 41. The large diameter portion 42b is fixed on the mounting groove portion 7e of the boss portion 7a so as to contact an end portion of the second bearing 30b. Thus, the second bearing 30b and the spring member 42 are retained with respect to the boss portion 7a. Accordingly, the spring member 42 provides the urging force between the friction plate 40b and the second bearing 30b. The spring member 42 retains the second bearing 30b with respect to the boss portion 7a, restricts rotation of the cap member 41 and further prevents the spring member itself from falling off all at the same time. Thus, the spring member 42 and the second bearing 30b are retained with respect to the boss portion 7a with an inexpensive structure.

SECOND EMBODIMENT

Figure 5:
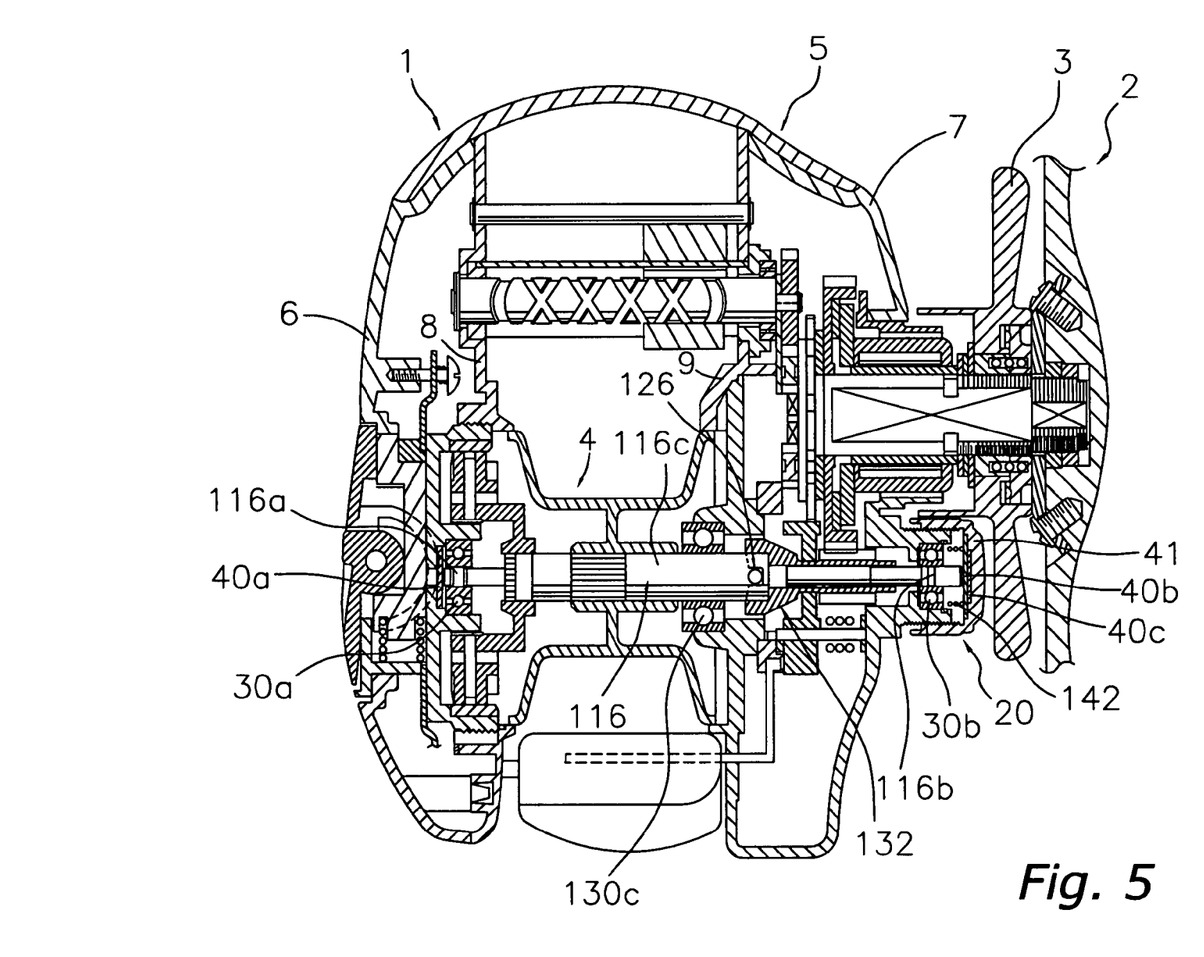
FIG. 5 is a cross-sectional view of a dual bearing reel in accordance with a second embodiment of the present invention.

Referring now to FIG. 5, a dual bearing reel in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The structures of the first embodiment and the second embodiment are the same except that the dual bearing reel of the second embodiment has a spool shaft 116, a pinion gear 132, a third bearing 130c and a spring member 142.

Referring to FIG. 5, the spool shaft 116 passes through the inner periphery of the spool 4. The spool 4 is non-rotatably mounted to the spool shaft 116. The spool shaft 116 includes a first end portion 116a, a second end portion 116b and a large diameter mid portion 116c. The first end portion 116a is rotatably supported by the first bearing 30a, which is arranged on the first side plate 8. The second end portion 116b is rotatably supported by the second bearing 30b, which is disposed on the second side cover 7. The second end portion 116b passes through the second side plate 9. The mid portion 116c is rotatably supported by the third bearing 130c that is mounted on the second side plate 9.

Referring to FIGS. 5 through 8, a clutch mechanism 126 has a clutch pin 126a and a clutch recess portion 126b formed at an end of the pinion gear 132. The clutch pin 126a and the clutch recess portion 126b configure the clutch mechanism 126 for transmitting (clutch ON state) and shutting down (clutch OFF state) the rotation of the handle 2. The clutch pin 126a is fixed to an end of the mid portion 116c. The clutch pin 126a protrudes in a radial direction of the spool shaft 116. A diameter of the spool shaft 116 gradually dwindles at three steps from the mid portion 116c toward the second end portion 116b. Specifically, the spool shaft 116 further includes a first shaft portion 116d, a second shaft portion 116e and a third shaft portion 116f. The first shaft portion 116d is adjacent the end of the mid portion 116c. The second shaft portion 116e has a diameter that is smaller than a diameter of the first shaft portion 116d. The third shaft portion 116f has a diameter that is smaller than a diameter of the second shaft portion 116e.

The pinion gear 132, which is a rotation transmitting mechanism for transmitting the rotation of the handle 2 to the spool 4, is supported in the reel unit 1 so as to be rotatable and movable in the axial direction. In the first embodiment, the pinion gear is rotatably supported by a bearing in a clutch ON state. In the second embodiment, however, the pinion gear 132 is supported by the spool shaft 116 in a clutch ON state.

The pinion gear 132 includes a teeth portion 132a, an operational recess portion 132b and a rotational supporting portion 132c. The teeth portion 132a meshes with an outer periphery of a main gear 131 of the rotation transmitting mechanism. The operational recess portion 132b is for interlocking with a clutch operation. The rotational supporting portion 132c is for rotationally supporting the pinion gear 132. The clutch recess portion 126b is formed on an end surface of the pinion gear 132. The operational recess portion 132b is formed between the teeth portion 132a and the clutch recess portion 126b. The rotational supporting portion 132c has a smaller diameter than a diameter of the teeth portion 132a. The rotational supporting portion 132c is formed on an end of the pinion gear 132 remote from the clutch recess portion 126b. The rotational supporting portion 132c is configured to rotate and fit within the through hole 7c of the second side cover 7.

Figure 6:
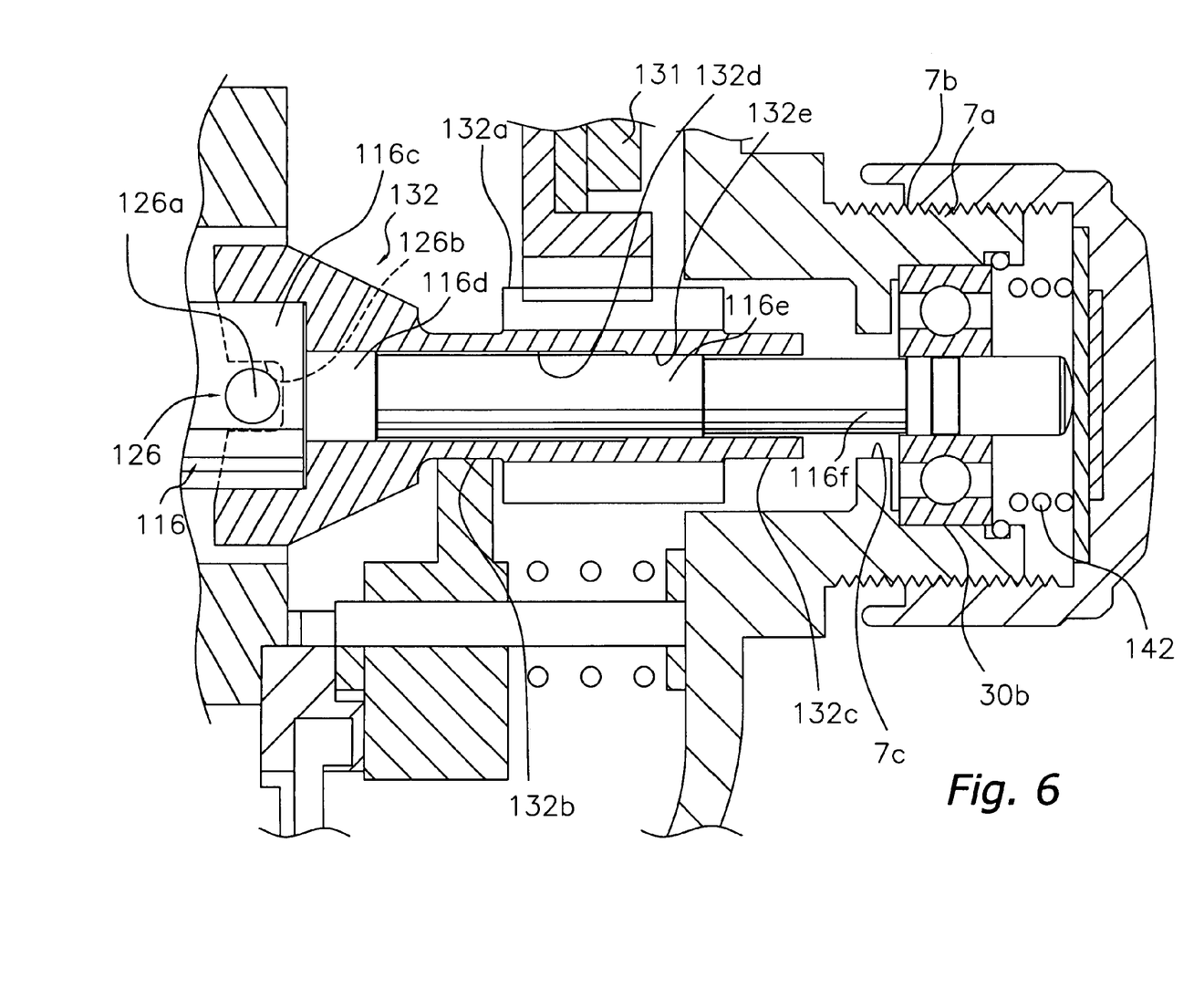
FIG. 6 is an enlarged partial cross-sectional view of a pinion gear position in a clutch ON state in accordance with the second embodiment of the present invention.
Figure 8:
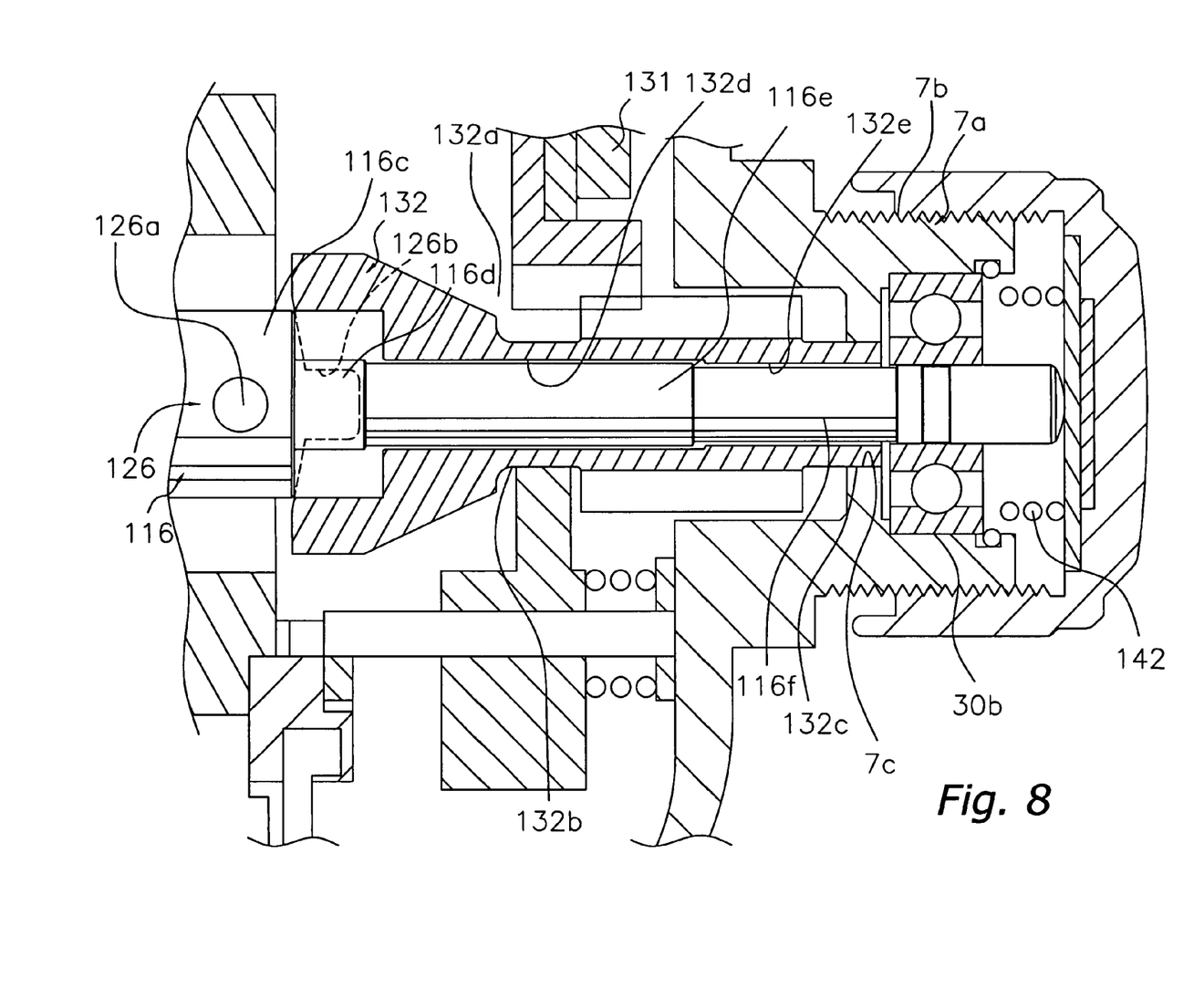
FIG. 8 is an enlarged partial cross-sectional view of a pinion gear position in the clutch OFF state in accordance with the second embodiment of the present invention.

The clutch ON state of the clutch mechanism 126 is shown in FIG. 6. Here, the clutch pin 126a is engaged in the clutch recess portion 126b. The clutch OFF state of the clutch mechanism 126 is shown in FIG. 8. The pinion gear 132 moves to the right of its position in FIG. 6 and the clutch recess portion 126b disengages from the clutch pin 126a. In the clutch OFF state, the spool 4 becomes freely rotatable to enable casting and line-releasing.

Figure 7:
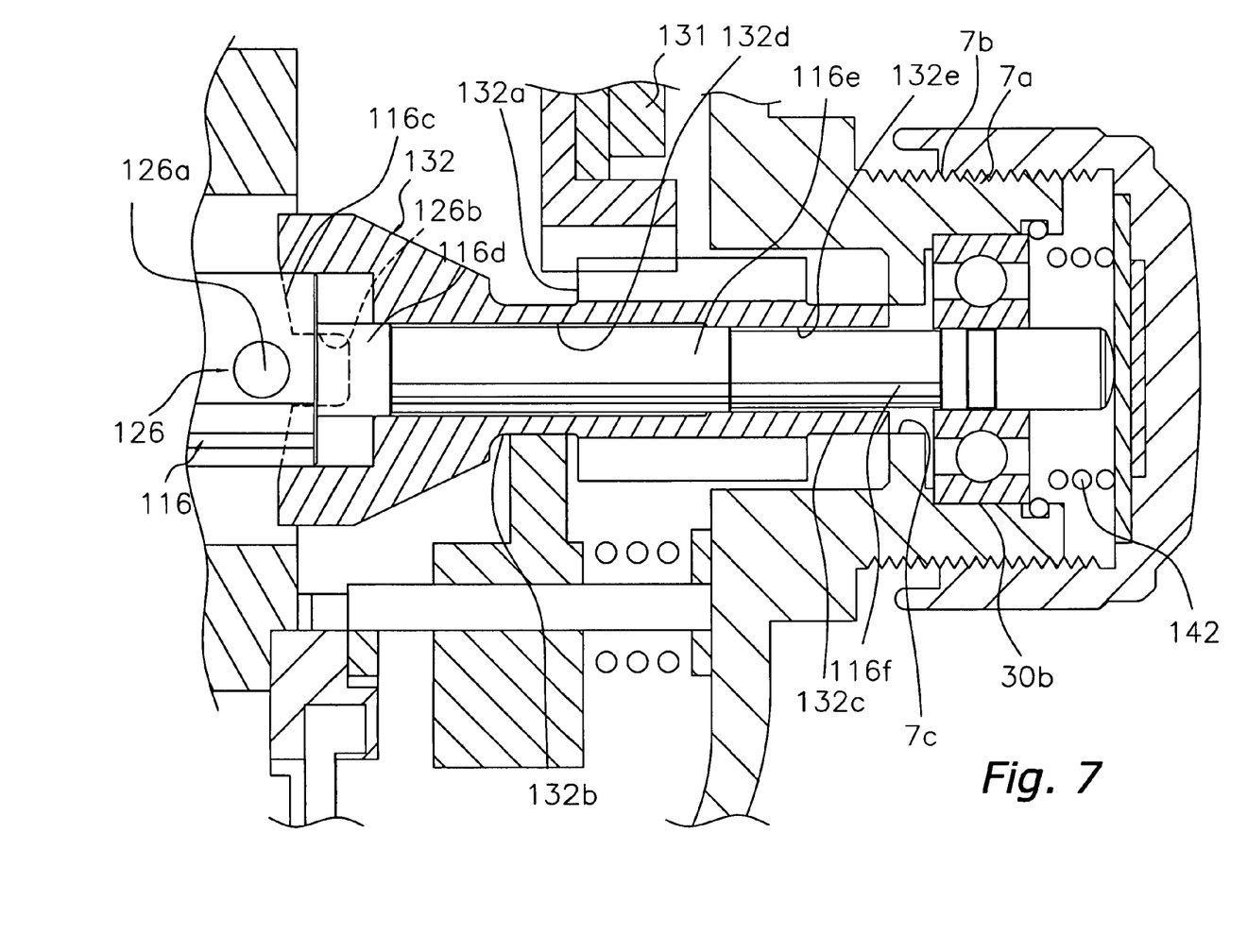
FIG. 7 is an enlarged partial cross-sectional view of a pinion gear position in a mid-state between the clutch ON state and a clutch OFF state in accordance with the second embodiment of the present invention.

Referring to FIG. 6, an inner peripheral surface of the pinion gear 132 includes a first supporting portion 132d and a second supporting portion 132e. The first supporting portion 132d contacts the first shaft portion 116d. The first supporting portion 132d rotatively supports the first shaft portion 116d. The second supporting portion 132e has a smaller inner diameter than an inner diameter of the first supporting portion 132d. The second supporting portion 132e contacts the second shaft portion 116e. The second supporting portion 132e rotatively supports the second shaft portion 116e. In the clutch ON state, the first supporting portion 132d and the second supporting portion 132e contact the first shaft portion 116d and the second shaft portion 116e, respectively, and the pinion gear 132 is rotatably supported by the spool shaft 116. As shown in FIG. 8, in the clutch OFF state, in which the pinion gear 132 moves to the other end (right side of FIG. 8), the first supporting portion 132d and the second supporting portion 132e disengage from the first shaft portion 116d and the second shaft portion 116e. The rotational supporting portion 132c fits into the through hole 7c and the pinion gear 132 is rotatably supported by the through hole 7c. As a result, the pinion gear 132 stops contacting the spool shaft 116 and a friction resistance is reduced. Thus, the rotational performance of the spool 4 in the clutch OFF state is increased. FIG. 7 illustrates a mid-state between the clutch ON state and the clutch OFF state. In the mid-state, the first supporting portion 132d and the second supporting portion 132e slightly contact the first shaft portion 116d and the second shaft portion 116e, respectively. As a result, the pinion gear 132 is supported by the spool shaft 116 until the rotational supporting portion 132c is supported by the through hole 7c.

The pinion gear 132 is supported by the through hole 7c of the boss portion 7a instead of a bearing in the clutch OFF state such that it prevents the pinion gear 132 from contacting the spool shaft 116. This inhibits the deterioration of the rotational performance with an inexpensive structure.

Figure 9:
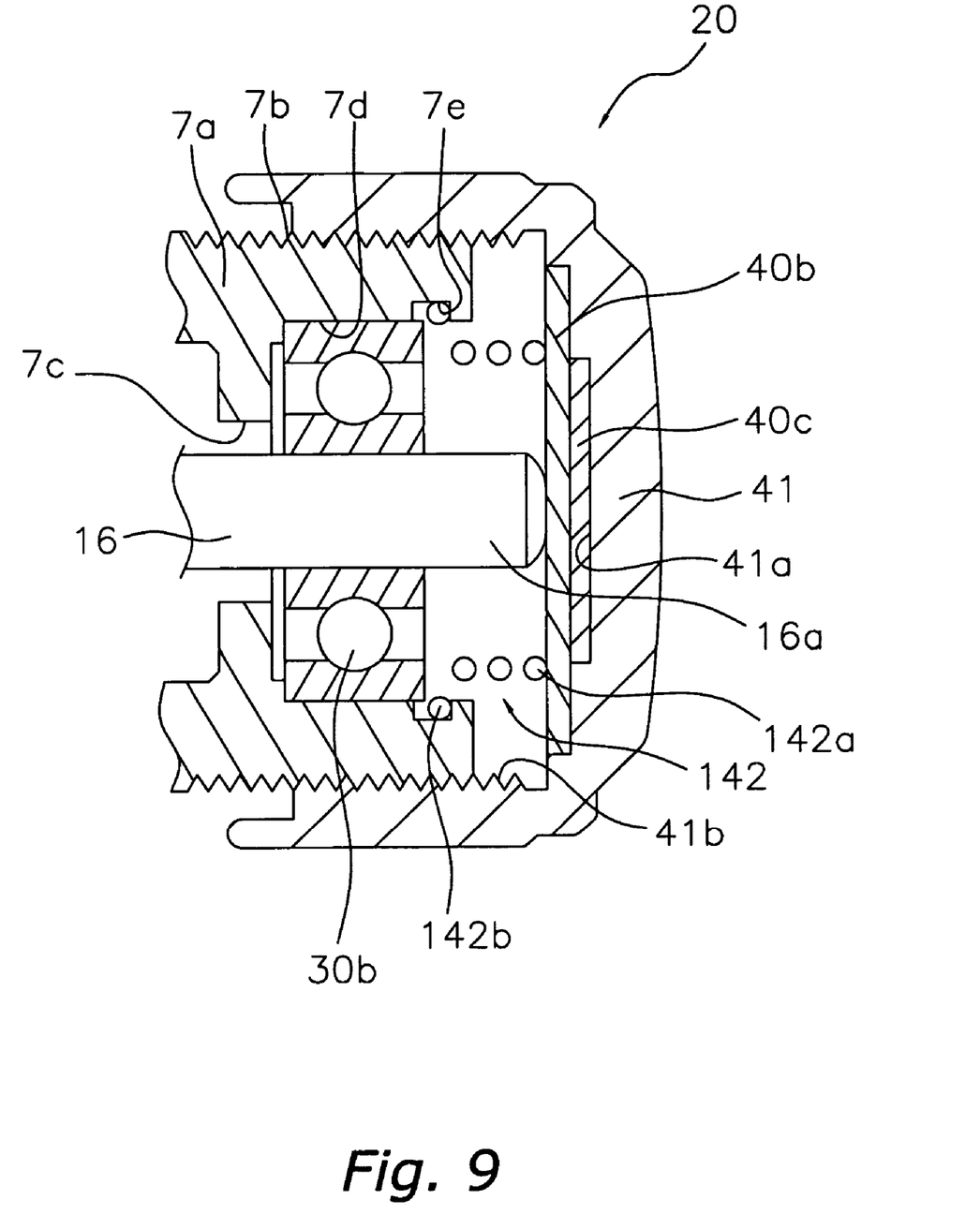
FIG. 9 is a partial cross-sectional view of a casting control mechanism of the dual bearing reel in accordance with the second embodiment of the present invention.

In the first embodiment, the spring member 42 is a coil spring having a diameter that gradually expands from the small diameter portion 42a toward the large diameter portion 42b. Referring to FIG. 9, in the second embodiment, the spring member 142 is a coil spring with a diameter that is approximately the same from a small diameter portion 142a toward a large diameter portion 142b. The diameter of the spring member 142 expands from near the large diameter portion 142b toward the large diameter portion 142b.

In the aforementioned embodiments, a low profile type dual bearing reel was used as an example of a spool for a fishing reel. However, it will be apparent to one of skill in the art from this disclosure that the present invention is not limited thereto, and can be applied, for example, to a round dual bearing reel.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A dual bearing reel comprising:
a reel unit configured to be mounted on a fishing rod;
a boss portion disposed on a side of the reel unit and including a male threaded portion formed on an outer periphery thereof and a through hole formed on an inner periphery thereof;
a spool rotatably mounted on the reel unit and configured to wind fishing line;
a spool shaft non-rotatably mounted in the spool and including a first end portion rotatably supported at another side of the reel unit and a second end portion rotatably supported at the boss portion;
a cap member detachably mounted on the boss portion and including a female threaded portion selectively engaged with the male threaded portion and an accommodation portion at an inner peripheral side of the cap member;
a bearing disposed on an inner peripheral surface of the through hole, and supporting the second end portion of the spool shaft;
a spring member fixed and mounted on the boss portion to provide an urging force between the accommodation portion and the bearing, the spring member retaining the bearing with respect to the boss portion and restricting rotation of the cap member.

2. The dual bearing reel according to claim 1, wherein an annular mounting groove is formed at the through hole such that the at least a portion of the mounting groove overlaps an axial end of the bearing in an outwardly axial direction, and the spring member includes a large diameter portion that is engaged in the mounting groove.

* * * * *